Aug. 28, 1923.

B. E. GETCHELL

BOX CONNECTOR

Filed Dec. 5, 1921

1,466,361

INVENTOR
Benjamin E. Getchell,
BY
ATTORNEYS.

Patented Aug. 28, 1923.

1,466,361

UNITED STATES PATENT OFFICE.

BENJAMIN E. GETCHELL, OF PLAINVILLE, CONNECTICUT, ASSIGNOR TO THE TRUMBULL ELECTRIC MANUFACTURING COMPANY, OF PLAINVILLE, CONNECTICUT, A CORPORATION OF CONNECTICUT.

BOX CONNECTOR.

Application filed December 5, 1921. Serial No. 519,914.

*To all whom it may concern:*

Be it known that I, BENJAMIN E. GETCHELL, a citizen of the United States of America, residing at Plainville, Hartford County, Connecticut, have invented a new and useful Box Connector, of which the following is a specification.

My invention relates particularly to improvements in means of connection between electric switch boxes and the like. It is customary to enclose the conductors in conduits, and to enclose the switches and cutouts in boxes. Frequently two boxes are arranged rather close together as for instance, where there is a meter switch box which is ordinarily kept locked and a cut-out or fuse box for a local or house line. These boxes are usually provided with openings and sometimes with removable sections or knockouts as they are called. The conductors which connect the two boxes are usually enclosed so as to prevent tampering and for safety sake. Frequently, it is difficult to bring the openings in the two boxes into alignment. I have sought to devise a construction which may be used to connect two boxes in such cases, even though the outlets in the boxes are not exactly opposite each other.

Figure 1:
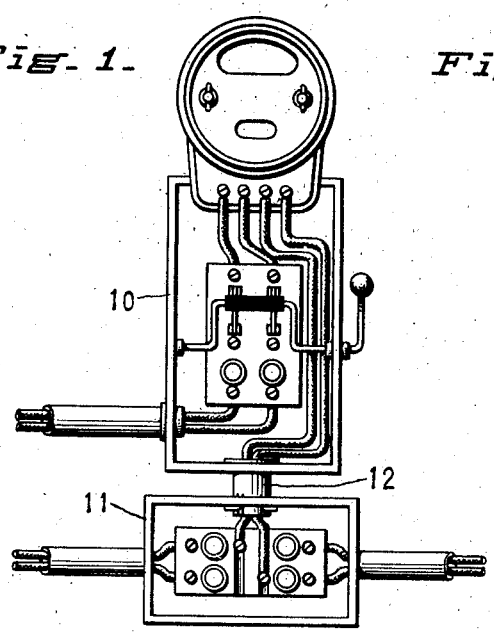
Figure 1 is a front view showing two boxes with a connector embodying my invention, the covers of the boxes being omitted.
Figure 2:
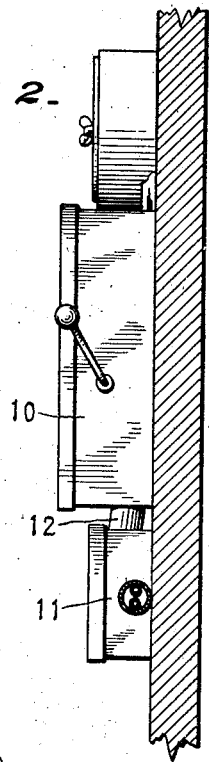
Fig. 2 is a side view of the same.
Figure 3:
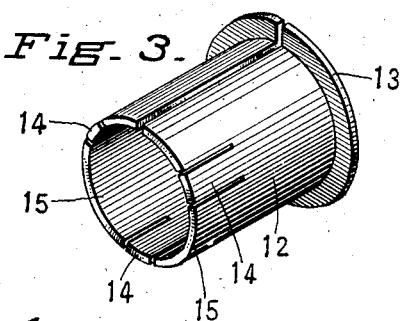
Fig. 3 is a perspective view of one of the connectors.
Figure 4:
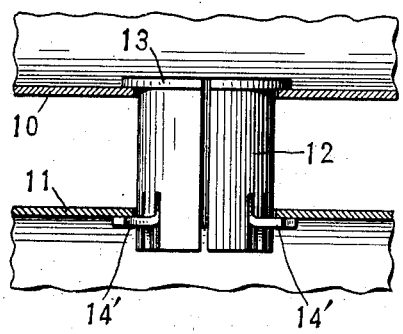
Fig. 4 shows one of my devices connecting fragments of two boxes where the openings in the boxes are in alignment.
Figure 5:
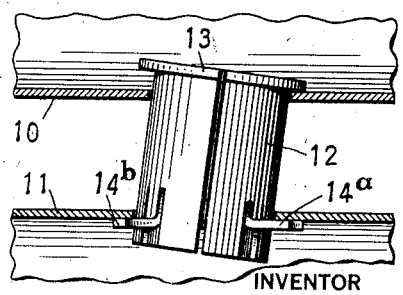
Fig. 5 is a similar view showing the device installed in a case where the holes in the boxes are out of alignment.

It will be understood that the boxes 10 and 11 are merely typical of any suitable construction which may be employed. The connector 12 is in the form of a tube which may be seamless as shown in Figs. 1 and 2, or split, as shown in Figs. 3, 4 and 5. This tube has means at one end, which in the form shown comprises a laterally extending flange 13, for holding the connection in one of the boxes, and one or more bendable fingers 14 are provided at the opposite end, with walls 15 between the fingers. When a flange 13 is provided that end of the tube carrying the flange will be somewhat rounded to present a smooth edge to the conductors when the latter are passed into the connector.

When the boxes are mounted on the wall or on a board as is customary, the connector is inserted through the adjacent openings in the boxes, and the ends of the fingers bent over as at 14'—14' of Fig. 4. The portions 15 between the fingers hold the connector in place, while the parts are being assembled. It will be obvious that there may be a considerable variation in the spacing between the boxes as each finger 14 can be bent at any point.

In Fig. 5 I have shown the condition where the holes in the boxes are not in alignment. In this case when the fingers are bent over, some of them can be bent over more than others. For instance, 14$^a$ is longer than 14$^b$. This nevertheless forms a secure connection in a very simple manner.

After the connector is assembled with the boxes, the conductors are passed therethrough in the usual manner.

I claim:

1. An electric box connector comprising a tubular member of substantially uniform diameter split at one end to provide fingers bendable at different lengths and having outwardly projecting stop means at the other end.

2. An electric box connector comprising a tube having an outwardly projecting stop flange at one end and split at the other end to provide a finger bendable at various lengths and having a positioning portion adjacent said finger.

3. An electric box connector comprising a tubular member having a permanent outward projection at one end and fingers at the other end with positioning members between the fingers, said fingers being adapted to be bent outwardly at different lengths.

4. A connector comprising a tubular member having a flange at one end and a plurality of lugs at the other end adapted to be bent over at different lengths.

BENJAMIN E. GETCHELL.